United States Patent [19]

Iijima

[11] 4,215,369
[45] Jul. 29, 1980

[54] DIGITAL TRANSMISSION SYSTEM FOR TELEVISION VIDEO SIGNALS

[75] Inventor: Yukihiko Iijima, Tokyo, Japan

[73] Assignee: Nippon Electric Company, Ltd., Tokyo, Japan

[21] Appl. No.: 970,051

[22] Filed: Dec. 15, 1978

[30] Foreign Application Priority Data

Dec. 20, 1977 [JP] Japan .............................. 52-153920
Dec. 20, 1977 [JP] Japan .............................. 52-153932
Mar. 28, 1978 [JP] Japan .............................. 53-36335

[51] Int. Cl.² ............................................. H04N 7/08
[52] U.S. Cl. ................................................... 358/146
[58] Field of Search ........................ 358/141, 142, 146

[56] References Cited

U.S. PATENT DOCUMENTS 3,811,008  5/1974  Lee .................................. 358/146 X

*Primary Examiner*—Robert L. Richardson
*Attorney, Agent, or Firm*—Sughrue, Rothwell, Mion, Zinn and Macpeak

[57] ABSTRACT

A digital transmission system for television video signals of the type which comprises a transmitter and a receiver, the transmitter having a plurality of input terminals for receiving respective television video signals to be transmitted, a plurality of encoding units for encoding the respective video signals into digitized video signals, and a multiplexers for multiplexing the respective digitized video signals in a time division manner, and the receiver having a demultiplexer for receiving the multiplexed video signal from the multiplexer and for separating the same into said digitized video signals, and a plurality of decoding units for decoding the digitized video signals into said respective television video signals, is disclosed.

11 Claims, 54 Drawing Figures

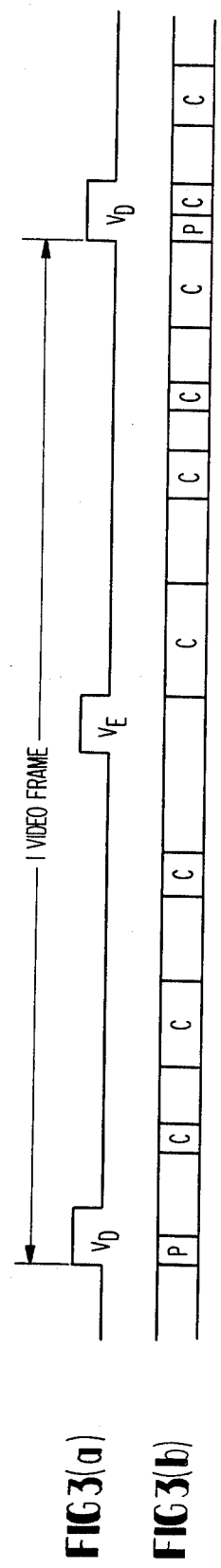
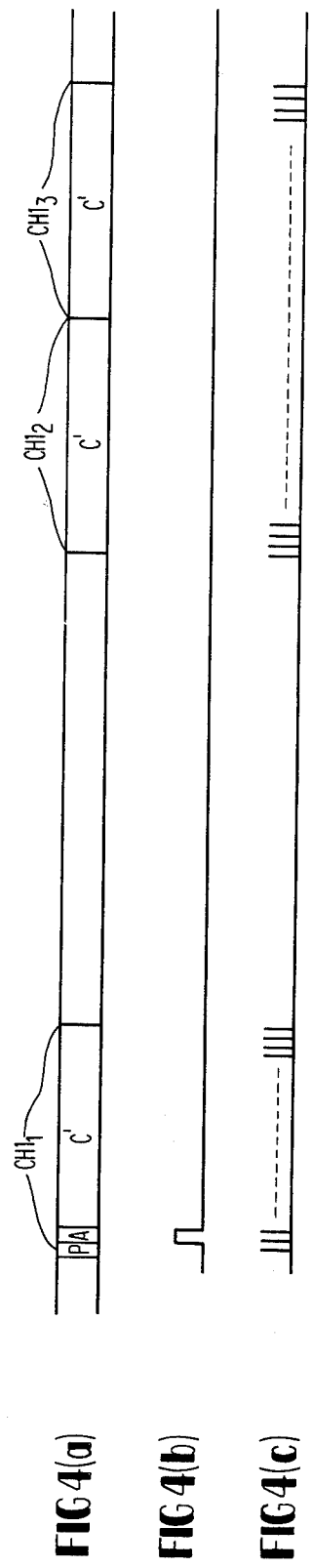

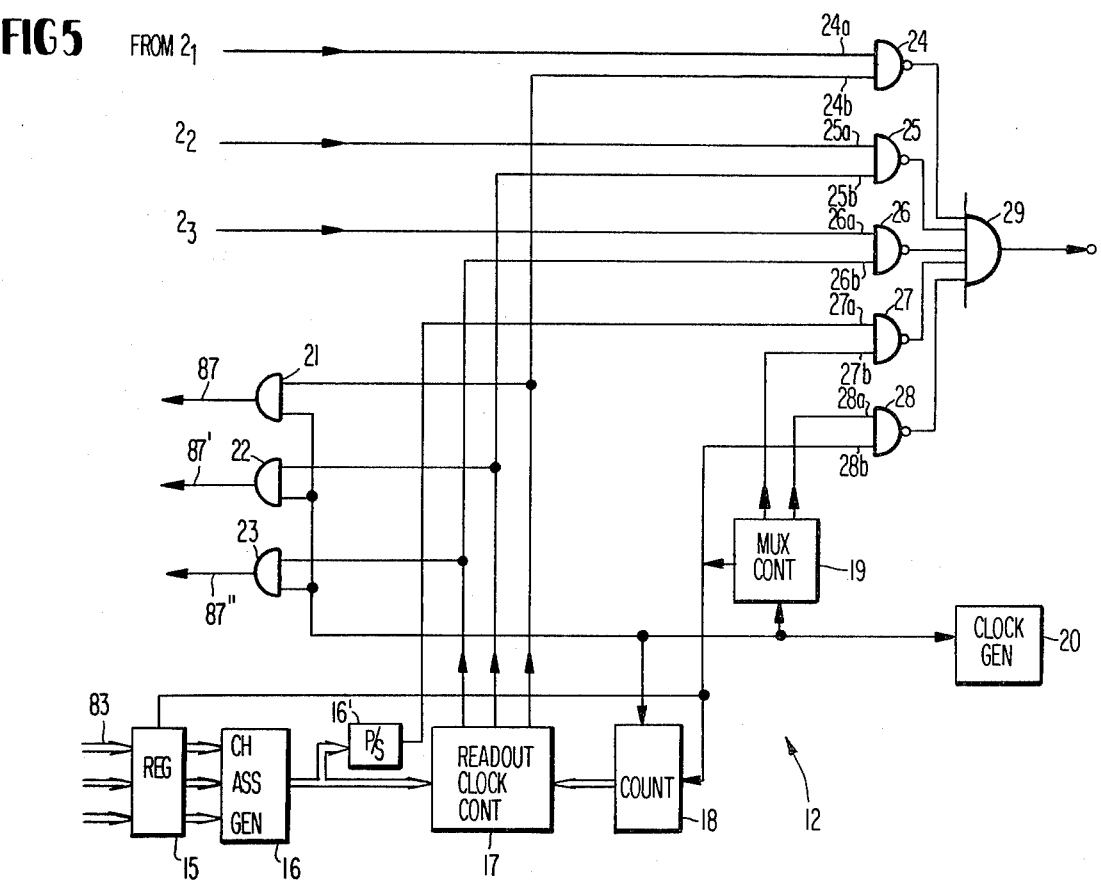
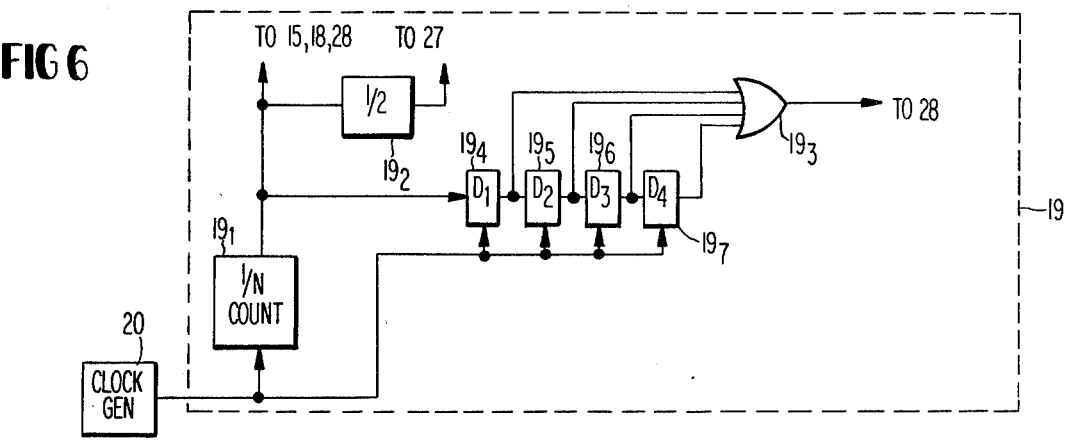
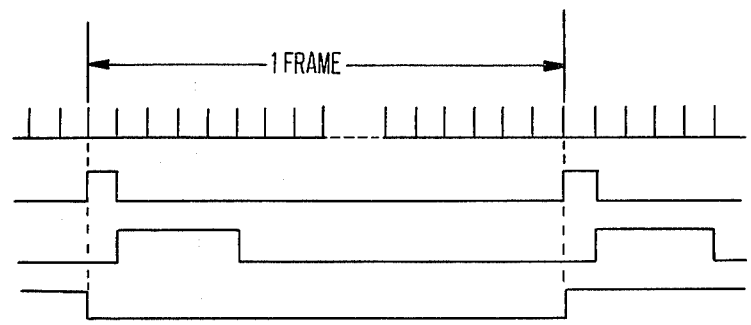

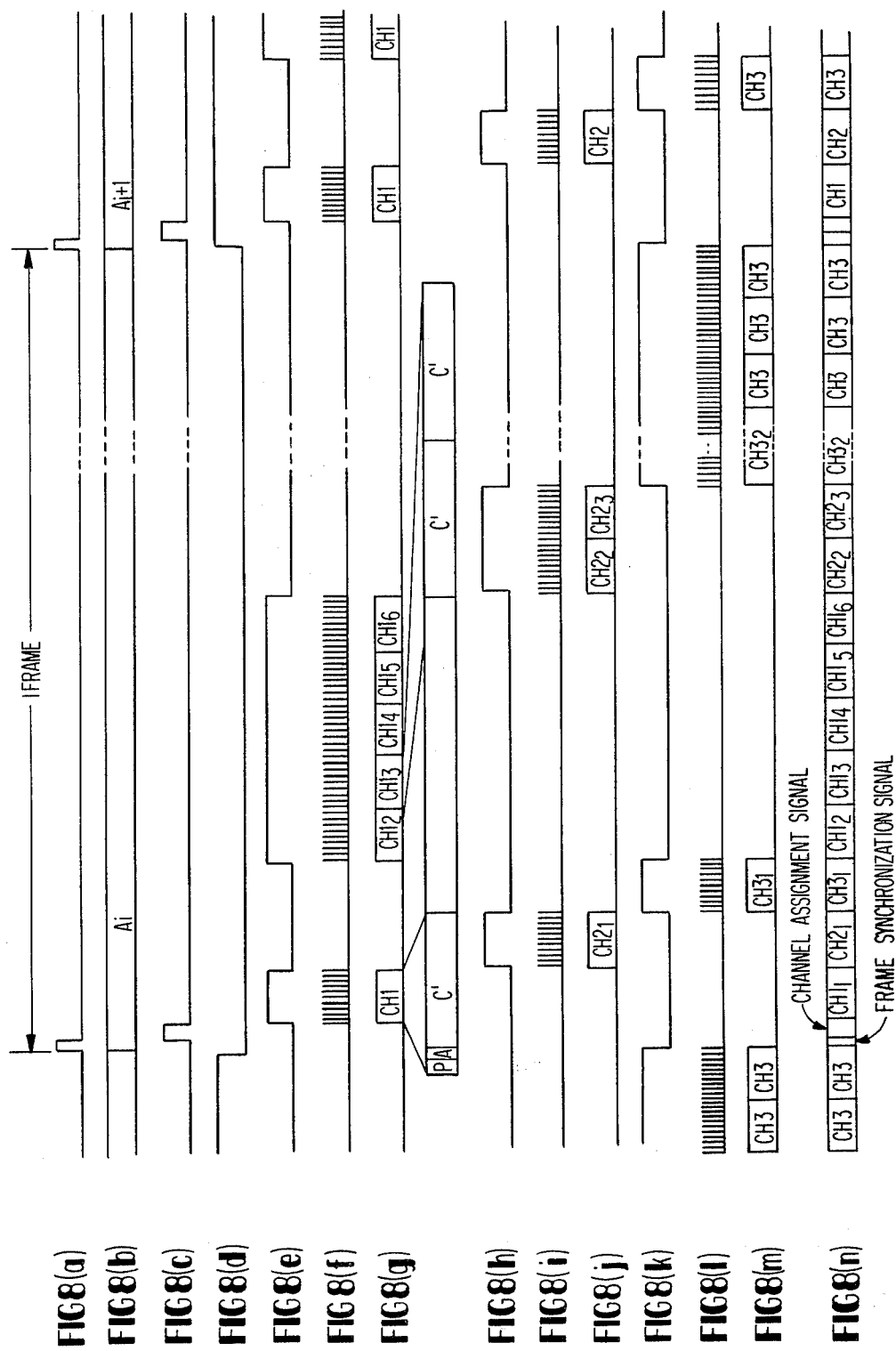

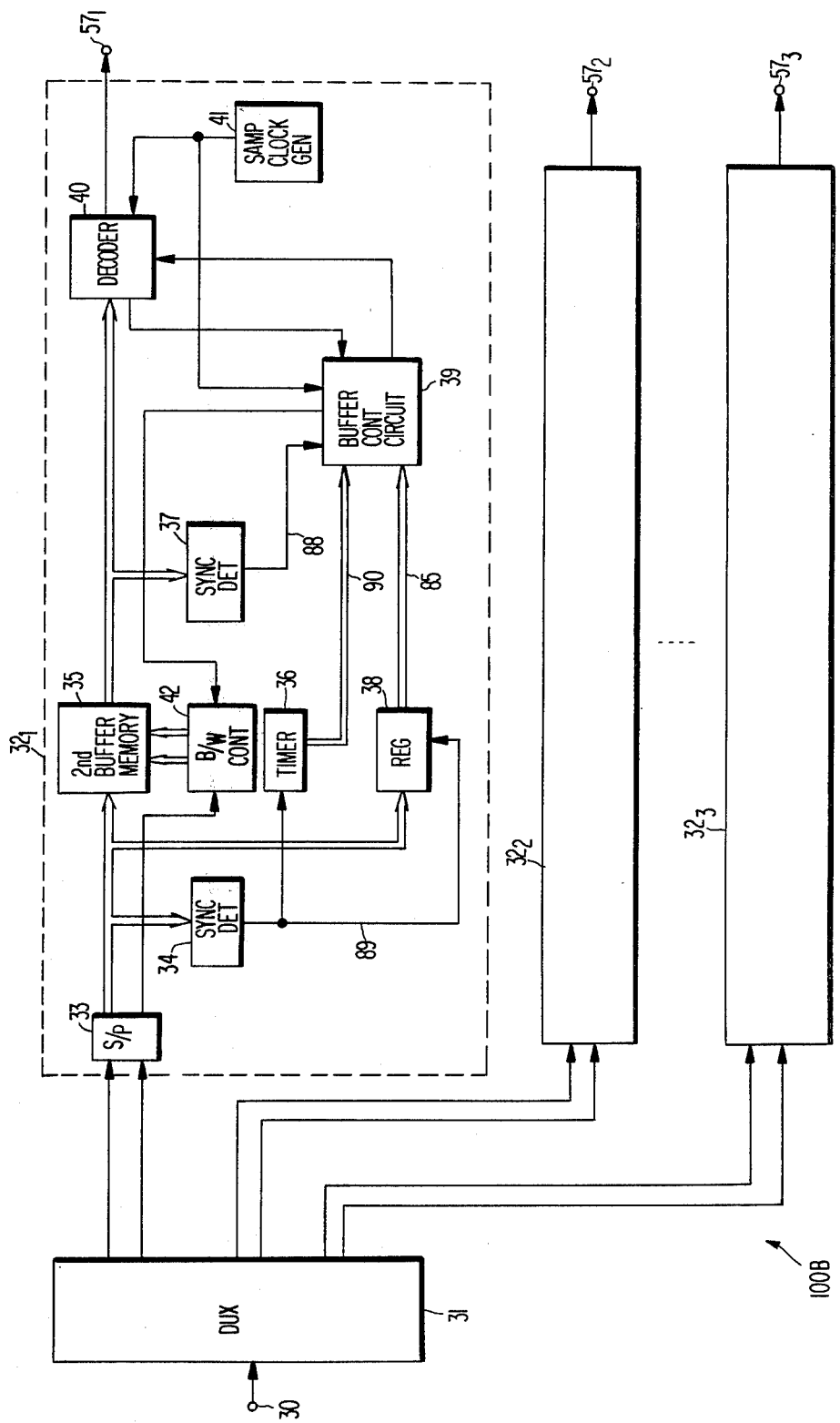

FIG 15
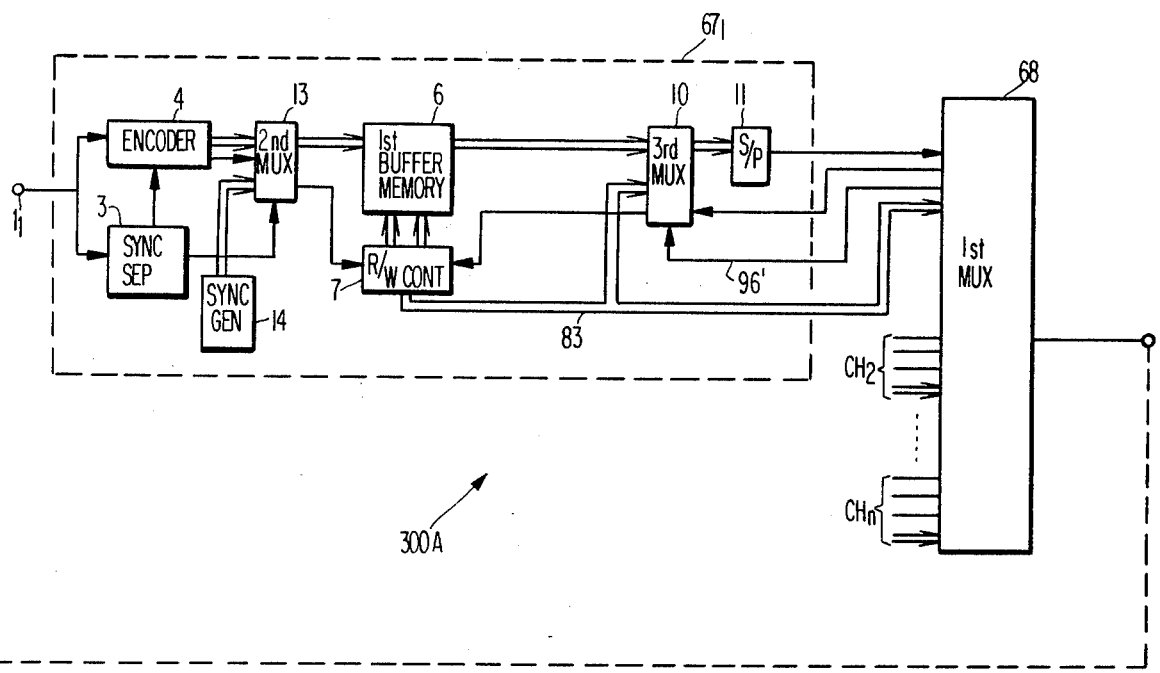
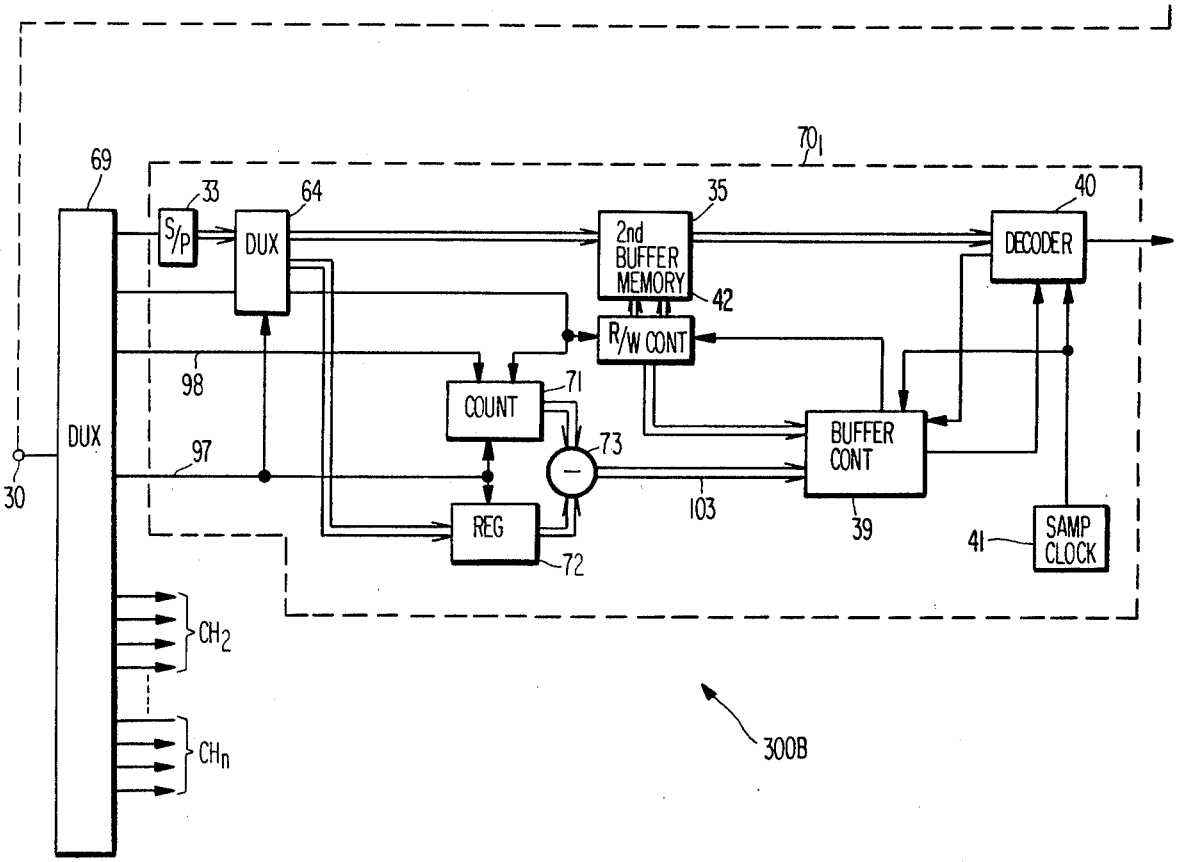

DIGITAL TRANSMISSION SYSTEM FOR TELEVISION VIDEO SIGNALS

FIELD OF THE INVENTION

This invention relates to a digital transmission system for television video signals with high transmission efficiency.

BACKGROUND OF THE INVENTION

To improve the transmission efficiency for digitized television video signals, a variable-length code technique has been used in prior arts such as variable-length differential pulse-code modulation systems and predictive encoding transmission systems based on interframe correlation. In either case, video signals to be transmitted are sampled at a sampling rate proportional to a predetermined scanning rate. However, since significant information to be transmitted is distributed at random with repsect to time, a buffer memory for temporarily storing encoded digital signals is needed on the transmitter side to transmit them at a predetermined bit rate. Correspondingly, another buffer memory for temporarily storing the digital signals transmitted is needed at the receiving end. Also, it is necessary to decode the received digital signals at the same sampling rate as that in the transmitter so as to avoid an overflow or underflow of the buffer memory at the receiver. In order to avoid such an overflow, the buffer memory of the receiver is required to have a capacity sufficiently larger than that of the transmitter.

To remove this restriction imposed on the receiver, a transmission system for digitized video signals has been proposed in the U.S. Pat. No. 4,027,100 issued May 31, 1977. According to this prior art, a buffer memory at the transmitter stores synchronization signals produced regularly, signals indicative of a buffer-occupancy state immediately following the respective synchronization signals, and information signals produced between each signal indicative of a buffer-occupancy state and the succeeding synchronization signal unevenly in response to the video signal to be transmitted. A buffer memory at a receiver stores the signals transmitted from the transmitter. A decoder coupled to the receiver-side buffer memory decodes the information signals at a decoding rate controlled with reference to the difference between an actual sum of buffer occupancies of both buffer memories and a value predetermined for the sum. However, this system can not be applied to the transmission whose transmission speed is constant.

Besides, a television video signal transmission system based on a time-division multiplex technique has been disclosed by Kaneko et al, in "Digital Transmission of Broadcast Television with Reduced Bit Rate", *National Telecommunications*, volume 3, 1977, section No. 41, pages 4-1 to 4-6. With this prior art, each channel information in one frame is assigned depending on the amount of information to be transmitted. However, because the transmission speed of information is not constant with respect to time, the improved technique disclosed in the U.S. Pat. No. 4,027,100 cannot be adapted to the second prior art.

An object of this invention is therefore to provide a digital transmission system for television video signals.

SUMMARY OF THE INVENTION

The present transmission system comprises a transmitter and a receiver, said transmitter comprising a plurality of input terminals for receiving respective television video signals to be transmitted, a plurality of encoding units for encoding said respective video signals into digitized video signals, and a multiplexer for multiplexing said respective digitzed video signals in a time division manner; and said receiver comprising a demultiplier for receiving the multiplexed video signal transmitted from said multiplexer and for separating the same into said digitized video signals, and a plurality of decoding units for decoding said digitized video signals given from said demultiplexer into said respective television video signals, the improvement wherein:

each of said encoding units comprises a synchronization (sync) pulse separator for separating sync pulses involved in said video signal, an encoder responsive to the separated sync pulses for encoding said television video signal into predetermined codes, a generator for generating video-frame-sync codes each indicative of the end of one picture frame of said video signal, first means for multiplexing said video-frame-sync codes and the encoded codes of said encoder, a first buffer memory for temporarily storing the multiplexed codes from said first means, a first read/write controller for supplying write-in and read-out address signals to said first buffer memory and for measuring a buffer-occupancy state of said first buffer memory to produce a buffer-occupancy code, second means for measuring a time interval from a time point when said video-frame-sync code is written into said first buffer memory to a time point when said video-frame-sync code is read out of said first buffer memory and for producing a first time-indicating code representative of said time interval, third means for multiplexing the codes read out from said first buffer memory and said first time-indicating code and for supplying the output therefrom to said multiplexer; and each of said decoding units comprises a second buffer memory for temporarily storing said digitized video signal supplied from the corresponding encoding unit, a second read/write controller for producing write-in address signals for writing said multiplexed codes and said time-indicting code into said second buffer memory, fourth means for detecting said first time-indicating code in said digitized video signal, fifth means for measuring a time interval from a time point when said video-frame-sync code is written into said second buffer memory to a time point when said video-frame-sync code is read out of said second buffer memory and for producing a second time-indicating code representative of said time interval, and a buffer memory controller for comparing said first and said second time-indicating codes and for controlling said write-in address signals based on said comparison.

BRIEF DESCRIPTION OF THE DRAWINGS

This invention will be described in greater detail in conjunction with the accompanying drawings in which:

FIGS. 2, 5 and 6 show block diagrams illustrating detailed portions of the transmitter of FIG. 1;

FIGS. 3a and 3b, FIGS. 4a through 4c, FIGS. 7a through 7d, and FIGS. 8a through 8n show waveforms for explaining the operation of the transmitter of FIG. 1;

FIG. 9 is a block diagram of a receiver for use in the first embodiment of this invention;

FIG. 15 is a block diagram of a third embodiment of this invention; and

DETAILED DESCRIPTION OF PREFERRED EMBODIMENTS OF THIS INVENTION

Figure 1:
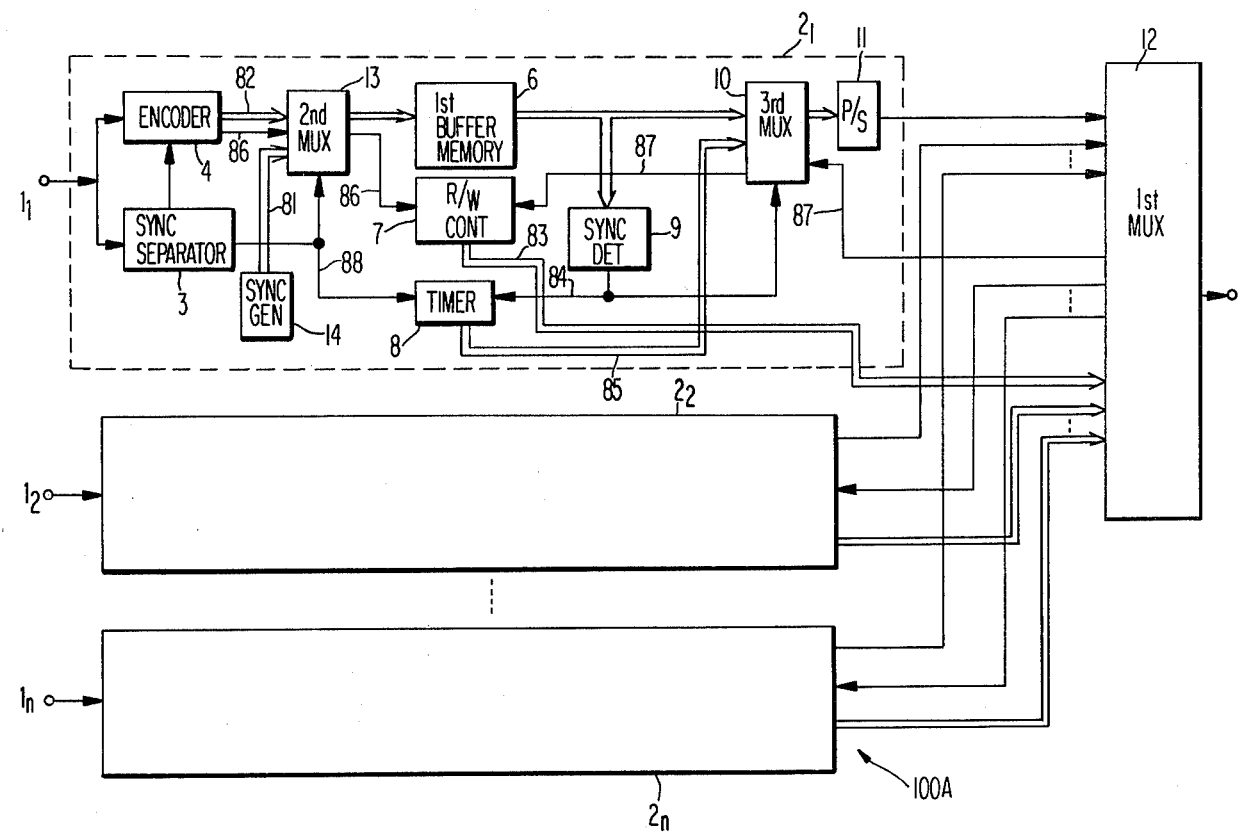
FIG. 1 is a block diagram of a transmitter for use in first embodiment of this invention.

First, a transmitter 100A for use in a first embodiment is described referring to FIGS. 1 through 4. A plurality of television video signals are given to input terminals $1_1, 1_2, \ldots, 1_n$ As shown in FIG. 3(a), each of the video signals comprises vertical sync pulses $V_O$ (odd field) and $V_E$ (even field) at a regular interval, horizontal sync pulses (not shown) equally distributed with respect to time between two adjacent vertical sync pulses, and an analog information signal (not shown) which follows each horizontal sync pulse and represents a flow of picture elements along a horizontal scanning line. Incidentally, in every drawing hereinafter referred to, thick signal lines represent the paths for parallel binary signals and thin signal lines, those for either analog signals or time-serial binary signals. Further, signal lines and signals may be sometimes represented by the same terms.

The video signals are respectively supplied to their corresponding encoding units $2_1$ to $2_n$ through input terminals $1_l$ to $1_n$ and encoded into digitized video signals. Each of the digitized video signals produced from the encoding units $2_1$ to $2_n$ are supplied to a first multiplexer 12 for multiplexing the digitized video signals. The multiplexed video signal is transmitted to a receiver over suitable transmission means (not shown). Since the encoding units $2_1$ to $2_n$ are identical to each other, description of only the unit $2_1$ will be made hereafter.

The video signal is supplied through the input terminal $1_l$ to a sync pulse separator 3 used in the encoding unit $2_l$, which separates sync pulses therefrom. Also, said video signal through the input terminal $1_1$ is given to an encoder 4 responsive to the horizontal sync pulses fed from the separator 3 so that the analog video information can be encoded into predetermined codes based on the interframe encoding and variable-length encoding operations at a predetermined sampling rate and in synchronism with the horizontal sync pulses. For the details of the encoder 4, reference is made to an article by Ishiguro et al titled "Composite Interframe Coding of NTSC Color Television Signals" published in *National Telecommunications Conference Record*, vol. 1, 1976, pages 6.4-1 to 6.4-4. A video-frame-sync code generator 14 produces video-frame-sync codes 81 each indicative of a picture frame end. A multiplexer 13 is responsive to the odd field vertical sync pulse $V_O$ supplied from the separator 3 to multiplex the video-frame-sync code 81 and the encoded codes 82 of the encoder 4. The output of the multiplexer 13 is then fed to a first buffer memory 6. Referring to FIG. 3b, reference characters P and C designate the video-frame sync code and significant codes, respectively.

Figure 2:
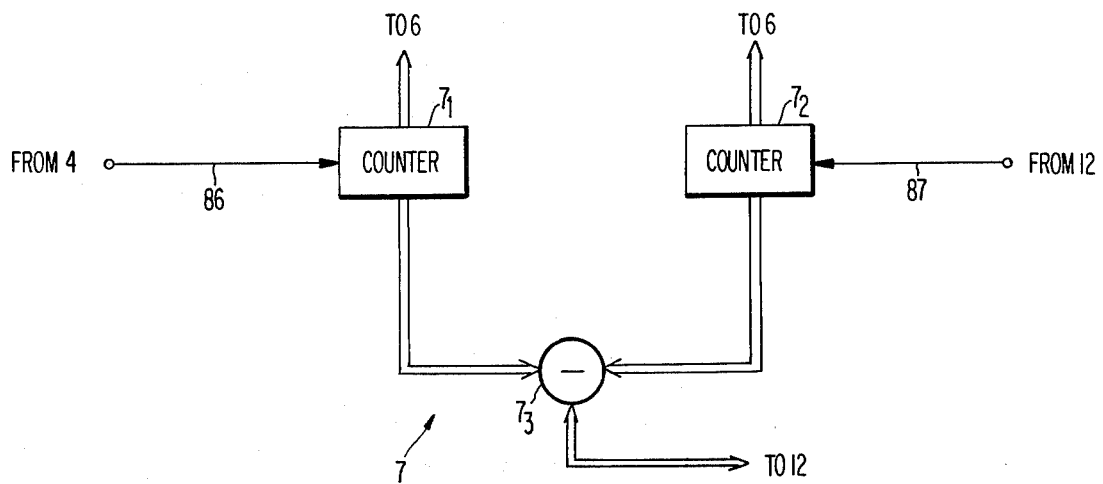

A read/write controller 7 of FIG. 2 is comprised of a first counter $7_1$ which counts writing pulses 86 supplied through the second multiplexer 13 from the encoder 4 and produces write-in address signals, and a second counter $7_2$ which counts reading pulses 87 supplied through a third multiplexer 10 from the first multiplexer 12 and produces read-out address signals, and a subtractor $7_3$ responsive to the output of the first and second counters $7_1$ and $7_2$ to perform a subtraction thereon and thereby to produce a buffer-occupancy code indicative of a buffer occupancy state of the buffer memory 6. The write-in and read-out address signals given from the counters $7_1$ and $7_2$ are applied to the buffer memory 6. On the other hand, the output of the subtractor $7_3$ is fed to the first multiplexer 12.

A video-frame-sync code detector 9 receives the codes read out of the buffer memory 6 to detect the video-frame-sync codes involved therein. The detection signal 84 fed from the detector 9 is then sent to both a third multiplexer 10 and a timer 8. The timer 8 includes a clock generator for generating clock pulses, and a counter for initiating its counting upon receiving the vertical sync pulses 88 obtained from the separator 3 and for terminating it upon receipt of the detection signal 84 given from the detector 9 to produce a code 85 indicative of a time interval therebetween. The time-indicating code 85 is supplied to the third multiplexer 10 in response to the signal 84 for multiplexing the codes read out of the buffer memory 6 and said time-indicating code 85. The output of the third multiplexer 10 is applied to the next stage, that is, a parallel/serial converter 11.

Referring to FIG. 4a corresponding to FIG. 8(g) referred to hereafter, "A" denotes the time-indicating code 85; "c'", a portion of the significant codes C of FIG. 3b, and $CH1_1$ to $CH1_3$, time slots assigned to the codes given from the encoding unit $2_1$.

Each of the time slots $CH1_1$ to $CH1_3$ has a constant capacity of, for example, 256 bits. Whereas, the total bit number of the codes involved in one picture frame of FIG. 3b is, 256 bits in the case of a still picture, and otherwise more than 256 bits. As a result, the time slot $CH1_1$ usually accommodates a portion c' of the codes of one picture frame and the remaining two time slots $CH1_2$ and $CH1_3$ (if necessary more than two) shares the other portion.

The multiplexer 12 will be described in more detail in connection with FIGS. 5 and 8. It is assumed for simplicity of description that the multiplexer 12 is connected to three encoding units $2_1$ to $2_3$. A register 15 responsive to frame sync pulses (FIG. 8a) supplied form a multiplexer controller 19 stores the first four significant bits of the buffer-occupancy codes 83 given from the read/write controllers 7 of the respective encoding units $2_1$ to $2_3$. A channel-assignment-signal generator 16 consisting of an ROM (read only memory) and coupled to the register 15 produces a channel-assignment signal (FIG. 8b) in response to the output of the register 15. A counter 18 coupled to both the multiplexer controller 19 and a clock generator 20 for generating clock pulses for transmission control, counts the clock pulses and is reset by the frame sync signal (FIG. 8a). A read-out signal controller 17 coupled to the channel assignment-signal generator 16 and the counter 18 produces gate pulses (FIGS. 8e, 8h and 8k) based on the output thereof. These gate pulses are then fed to AND gates 21, 22 and 23, respectively, to which the clock pulses are applied from the clock generator 20. The AND gates 21 to 23 produce respectively the signals 87, 87' and 87" (FIGS. 8f, 8i, and 8l) one of which is supplied to the read/write controller 7 through the third multiplexer 10. NAND gates 24, 25, and 26 receive respectively, at their one input terminals 24a, 25a, and 26a, the codes fed from the parallel/serial converters 11 of the encoding units $2_1$ to $2_3$, and also receive respectively, at their other input terminals 24b, 25b, and 26b, the signals (FIGS. 8e, 8h and 8k) given from the read-out signal controller 17. A NAND gate 27 is supplied at its one input terminal 27a with the channel-assignment signal through a parallel/serial converter 16' from the generator 16, and, at its other input terminal 27b, with an assignment-signal-multiplexing pulse (FIG. 8c) given from the multiplexer controller 19. On the other hand, a NAND gate 28 receives, at its input terminals 28a and 28b, a frame sync signal (FIG. 8d) and the frame-sync-signal-multiplexing pulse (FIG. 8a) fed from the multiplexer controller 19, respectively. The output terminals of the NAND gates 24 to 28 are coupled to the input terminal of another NAND gate 29 which forms an OR gate together with its preceding NAND gates 24 to 28. Thus, the first multiplexer 12 multiplexes the digitized video signals (FIGS. 8g, 8j and 8m) and the channel assignment and frame sync signals (FIGS. 8b and 8d). The multiplexed video signal appears at the output terminal of the NAND gate 29.

Referring now to FIGS. 6 and 7, a detailed construction of the multiplexer controller 19 is illustrated together with the clock generator 20. The clock pulses (FIG. 7a) of the generator 20 are applied to a 1/N frequency divider $19_1$ (where N is an integer equal to the number of clock pulses appearing during one frame time interval from the generator 20) and to four delay circuits $19_4$ to $19_7$ (the number four comes from the assumption that the register 15 of FIG. 5 stores the four significant bits of the incoming codes 83). The output of the frequency divider $19_1$ is given to the register 15, the counter 18, and a half-frequency divider $19_2$ as well as the NAND gate 28 as the frame-sync-signal-multiplexing pulse (FIG. 7b and FIG. 8a). The divider $19_2$ divides the frequency of the frame-sync-signal-multiplexing pulse by ½ to produce a channel-assignament-signal multiplexing pulse supplied to the NAND gate 27 as the frame sync signal (FIG. 7d and FIG. 8c). The output of the 1/N frequency divider $19_1$ is also fed to the delay circuit $19_4$, the output of which is applied to the next delay circuit $19_5$. The other delay circuits $19_6$ and $19_7$ are responsive to the output of their preceding circuits $19_5$ and $19_6$, respectively. The output of the delay circits $19_4$ to $19_7$ are then supplied to an OR gate $19_3$ to give the channel-assignment-multiplexing pulse (FIG. 7c and FIG. 8d).

Referring to FIG. 9, a receiver 100B usd in the first embodiment of this invention is schematically illustrated in block form. A demultiplexer 31 is supplied with the multiplexed video signal received from the transmitter 100A through an input terminal 30. The demultiplexer 31 functions to separate the supplied multiplexed video signal into n channels (only three channels are shown in FIG. 9) of digitized video signals which correspond respectively to the output of the encoding units $2_1$ to $2_n$. The demultiplexer 31 supplies the n channels of digitized video signals to respective decoding units $32_1$ to $32_n$, each of which serves to decode the received digitized video signal into its original video signal. Since the decoding units $32_1$ to $32_n$ are identical to each other in their circuit configuration, only the unit $32_1$ will be described hereunder.

A serial/parallel converter 33 converts the serial digitized video signal of one channel given from the demultiplexer 31 into a time parallel digitized video signal. The parallel digitized video signal is then fed to a second buffer memory 35 and temporarily stored therein. A decoder 40 coupled to the second buffer memory 35 is responsive to sampling pulses supplied from a sampling-clock-pulse generator 41 for decoding the output of the buffer memory 35. The decoder 40 will be again referred to later by reference to FIG. 11.

A video-frame-sync code detector 34 coupled to the converter 33 detects the video-frame-sync code involved in the time parallel digitized video signal to produce a detection signal 89. The signal 89 is supplied to a timer 36 and to a register 38. A read/write controller 42 is identical to the read/write controller 7 (FIG. 2) except that the former is not provided with the subtractor $17_3$. It is therefore understood that the read/write controller 42 responsive to writing pulses supplied through the converter 33 from the demultiplexer 31 as well as reading pulses from the buffer controller 39 produces write-in and read-out address signals supplied to the second buffer memory 35 for controlling its writing/reading operations. Another video-frame-sync code detector 37 connected to the buffer memory 35 detects the video-frame-sync code read out therefrom to produce a detection signal 88 to be sent to the buffer controller 39. The register 38, in response to the detection signal 89, stores a first time-indicating code transmitted from the transmitter 100A. The controller 39, which will be described later in more detail by reference to FIG. 11, controls both the second buffer memory 35 and the decoder 40 based on the signals 90 and 85. The video-frame-sync code detector 34 or 37 and the timer 36 are identical to their counterparts shown in FIG. 1.

Figure 10:
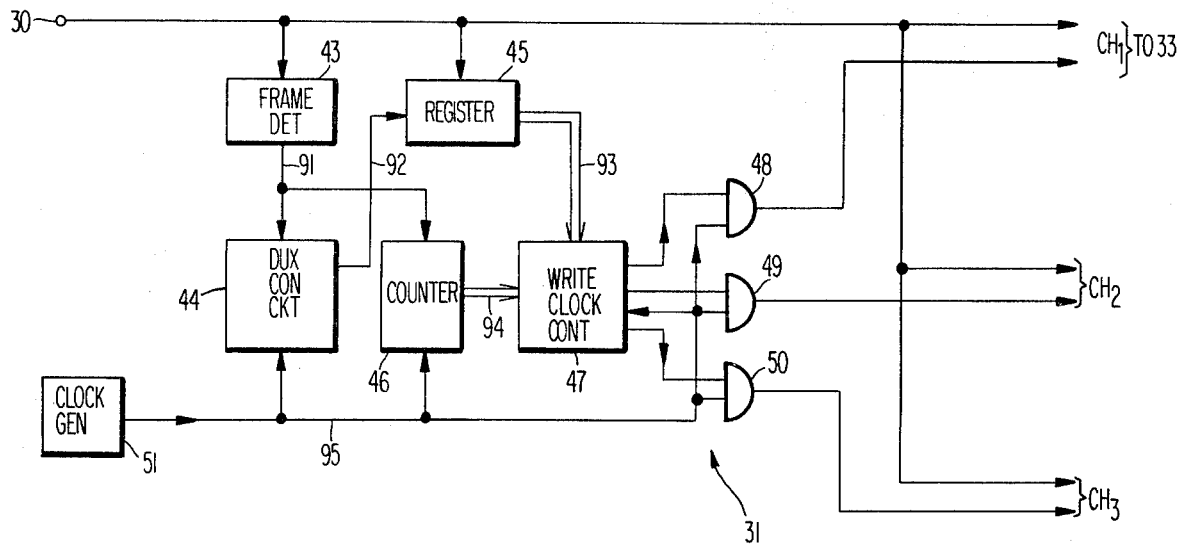
FIGS. 10 and 11 show block diagrams illustrating detailed portions of the receiver of FIG. 9.

The demultiplexer 31 will be described in more detail referring to FIG. 10. A frame-sync-signal detector 43 coupled to the input terminal 30 detects the frame sync signal given from the received multiplexed video signal for producing a signal 91 to be supplied to a demultiplexer controller 44 and to a counter 46. The controller 44, in response to the signal 91 as well as clock pulses 95 given from a clock generator 51 produces a channel-assignment-signal multiplexing pulse, and consists of the delay circuits $19_4$ to $19_7$ and the OR gate $19_3$ shown in FIG. 6. The signal 92 is supplied to a register 45 for storing the channel-assignment-signal in the received multiplexed video signal, resulting in producing a signal 93 indicative of the channel-assignment signal. The counter 46 counts the clock pulses 95 given from a clock generator 51 and is reset by the signal 91. A write-in signal controller 47 consisting of a ROM produces gate pulses in response to the signals 93 and 94 and the clock pulses 95. The output of the controller 47 is supplied to AND gates 48, 49 and 50 for selectively allowing them to pass the clock pulses 95 therethrough. The clock pulses passing through the AND gate 48 are supplied as the writing signals to the read/write controller 42 through the serial/parallel converter 33 as shown in FIG. 9, while the remaining clock pulses passing through the AND gates 49 and 50 are supplied to counterparts (not shown) of the decoding units $32_2$ and $32_3$ of FIG. 9.

Figure 11:
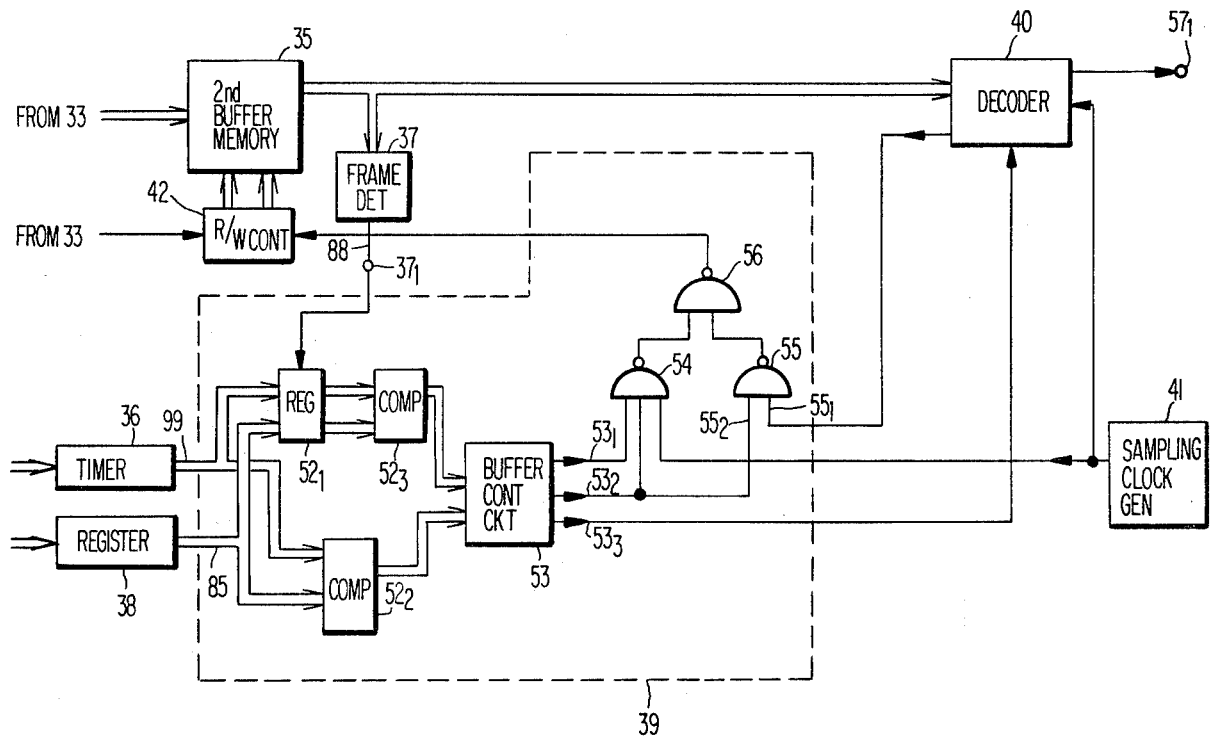

FIG. 11 is a detailed block diagram of the buffer memory controller 39 and its known peripheral blocks. The controller 39 comprises a register $52_1$, two comparators $52_2$ and $52_3$, a buffer control circuit 53 consisting of an ROM, and three NAND gates 54 to 56 functioning as a whole as two AND gates and an OR gate. The register 52₁ responsive to the signal 88 supplied from the detector 37 stores the first and the second time-indicating codes 85 ($\tau_S$) and 90 ($\tau_R$), respectively. The comparators 52₂ and 52₃ function to produce signals indicating the following three different formulae or conditions depending upon relations between $\tau_S + \tau_R$ and $\tau_D$ and $\Delta$:

$$|\tau_S + \tau_R - \tau_D| \leq \Delta \qquad (1)$$

$$\tau_S + \tau_R - \tau_D > \Delta \qquad (2)$$

$$\tau_S + \tau_R - \tau_D < -\Delta \qquad (3)$$

where $\Delta$: a predetermined positive real number; and $\tau_D$: a signal indicative of a predetermined time interval determined by transmission speed over a transmission line used as well as capacities of the buffer memories 6 and 35.

In response to the signals given from the comparators 52₂ and 52₃, the controller 53 produces binary "1" and/or "0" depending on the above conditions. Specifically, the controller 53 consisting of a ROM produces the following logical values depending on the conditions (1) to (3):

(a) If the condition (1) is satisfied, binary "0" appears on the lines 53₁ and 53₃, and a binary "1" appears on the line 53₂;

(b) If the condition (2) is satisfied, a binary "1" appears on all the lines 53₁ to 53₃; and (c) If the condition (3) is satisfied, a binary "1" or "0" appears on the line 53₁ and binary "0" appears on the lines 53₂ and 53₃.

Therefore, the NAND gate 56 produces a binary "1" on its output terminal, if all the inputs of the NAND gate 54 are binary "1" or all the inputs of the NAND gate 56 are binary "1".

Since the receiver 100B of FIG. 9 functions in just a reverse manner as the transmitter 100A except the buffer memory controller 39, for understanding of the operation of the receiver 100B, the operations limited to the controller 39 will be described in detail hereinafter.

First of all, let us consider the case where the above condition (1) is satisfied, namely, the buffer memory 35 has a proper amount of codes stored so that the decoder 40 is requested to perform its decoding operation. In this case, the controller 53 produces binary "1" on the signal line 53₂ and binary "0" on the signal lines 53₁ and 53₃. For this reason, the decoder 40 receives binary "0" appearing on the line 53₃, and as a reuslt, the decoding operation of codes read out from the second buffer memory 35 is not prohibited, allowing the request signal fed to the input terminal 55₁ of the gate 55 from the decoder 40 to become binary "1". On the other hand, since the input terminal 5₂ of the gate 55 receives a binary "1" through the signal line 53₂, all the input signals to the NAND gate 55 become binary "1", so that the NAND gate 56 may produce the write signal responsive to the request signal.

Next, considering the case where the condition (2) is satisfied. In this instance, codes more than the predetermined amount are stored in the buffer memory 35. Since binary "1" appearing on the line 53₃ makes the decoder 40 stop its decoding operation, the decoder 40 produces binary "0" which is applied to one input terminal of the NAND gate 55. On the other hand, in response to a binary "1" appearing on the lines 53₁ and 53₂, the NAND gate 54 allows the clock pulses given from the clock generator 41 to pass the NAND gates 54 and 56. Therefore, the write-in signals corresponding to the passed clock pulses are fed to the second buffer memory 35. This means that the codes stored in the memory 35 are read out in response to the applied clock pulses. The codes thus read out are supplied to the decoder, but no decoding operation can be performed until the condition (1) is satisfied. This means that the codes are read out in vain from the buffer memory 35 because the rate of the clock pulse generation is greater than the that of the request signal generation.

Finally, let us consider the case where the condition (3) is satisfied, wherein the amount of codes stored in the buffer memory 35 does not reach the predetermined level. It is apparent in this instance that the clock pulses given from the clock generator 41 are not allowed to pass the NAND gate 56. As a result, the codes stored in the memory 35 are not read out therefrom until the first time-indicating signal 90 ($\tau_R$) satisfies the condition (1). While the condition (3) is satisfied, the decoder 40 remains in its non-decoding state without producing an output or, otherwise, it may be designed to produce the preceding picture frame information stored in a frame memory used in the decoder 40. However, this operation of the decoder 40 is not directly concerned with this invention, so further description thereof will be omitted.

In the first embodiment, the supply of the write-in signal or clocks to the second buffer memory 35 is controlled by the time-indicating codes $\tau_S$, $\tau_R$, and $\tau_D$. However, the supply of the write-in signal to the second buffer memory 35 can be controlled by the buffer-occupancy code and the read-our signal generation rates of both the first and the second buffer memories 6 and 35 and by the write-in rate of codes into the first buffer memory 6.

More specifically, it will be understood that the following equations are given:

$$V_S(t) = V_R(t + \delta) \qquad (4)$$

$$W_S(t) = W_R(t + \alpha) \qquad (5)$$

where $V_S(t)$: the read-out rate of the codes given from the first buffer memory 6;

$V_R(t)$: the write-in rate of the codes into the second buffer memory 35;

$\delta$: delay time (second) of signal transmission over a transmission line;

$W_S(t)$: the write-in rate of the codes into the first buffer memory 6;

$W_R(t)$: the read-out rate of the codes from the second buffer memory 35;

$\alpha$: delay time (second) from the write-in operation of the codes into the first buffer memory 6 to the read-out operation of the codes given from the second buffer memory 35, wherein $\alpha = \eta + \delta$ ($\eta$ is therefore equal to the sum of respective delay times of the codes passing through the two buffer memories 6 and 35).

On the other hand, the amount of codes stored in the first buffer memory 6 at a given time t can be expressed by $$B_S(t) = \int_{-\infty}^{t} \{W_S(\tau) - V_S(\tau) d\tau\} \quad (6)$$

Likewise, the amount of codes stored in the second buffer memory 35 at a given time t can be expressed by $$B_R(t) = \int_{-\infty}^{t} [V_R(\tau) - W_R(\tau)]d\tau \quad (7)$$

Under the conditions given by the equations (4) and (5), $$B_R(t + a) = \int_{-\infty}^{t+a} [V_R(\tau) - W_R(\tau)]d\tau$$
$$= \int_{-\infty}^{t+a} [V_S(\tau - \delta) - W_S(\tau - a)]d\tau$$
$$= \int^{t+\epsilon} V_S(\tau)d - B_S(t) \quad (8)$$
$$= \int_{(t+a)-\epsilon}^{t+a} V_R(\tau)dt - B_S(t) \quad (9)$$

From the equations (6) and (7), we obtain $$B_S(t) + B_R(t + \delta) = \int_{-\infty}^{t} [W_S(\tau) - V_S(\tau)]d\tau +$$
$$\int_{-\infty}^{t+\delta} [V_R(\tau) - W_R(\tau)]d\tau$$
$$= \int_{t-\epsilon}^{t} W_S(\tau)d$$
$$\therefore B_R(t + \delta) = \int_{t-\epsilon}^{t} W_S(\tau)d - B_S(t) \quad (10)$$

In the case where the transmission speed is a function of time, if the delay time from the write-in operation of codes into the first buffer memory 6 to the read-out operation of the same from the second buffer memory 35 is α (constant), the equations (8), (9) and (10) are satisfied. It is therefore understood that if the read-out timing at the buffer memory 35 is so controlled as to satisfy the equations (8), (9) and (10), the above delay time α is made constant.

The following three embodiments of this invention are respectively constructed based on the equations (8) to (10), wherein their parts corresponding to those in the first embodiment of FIGS. 1 to 11 are designated by like reference characters.

Figure 12:
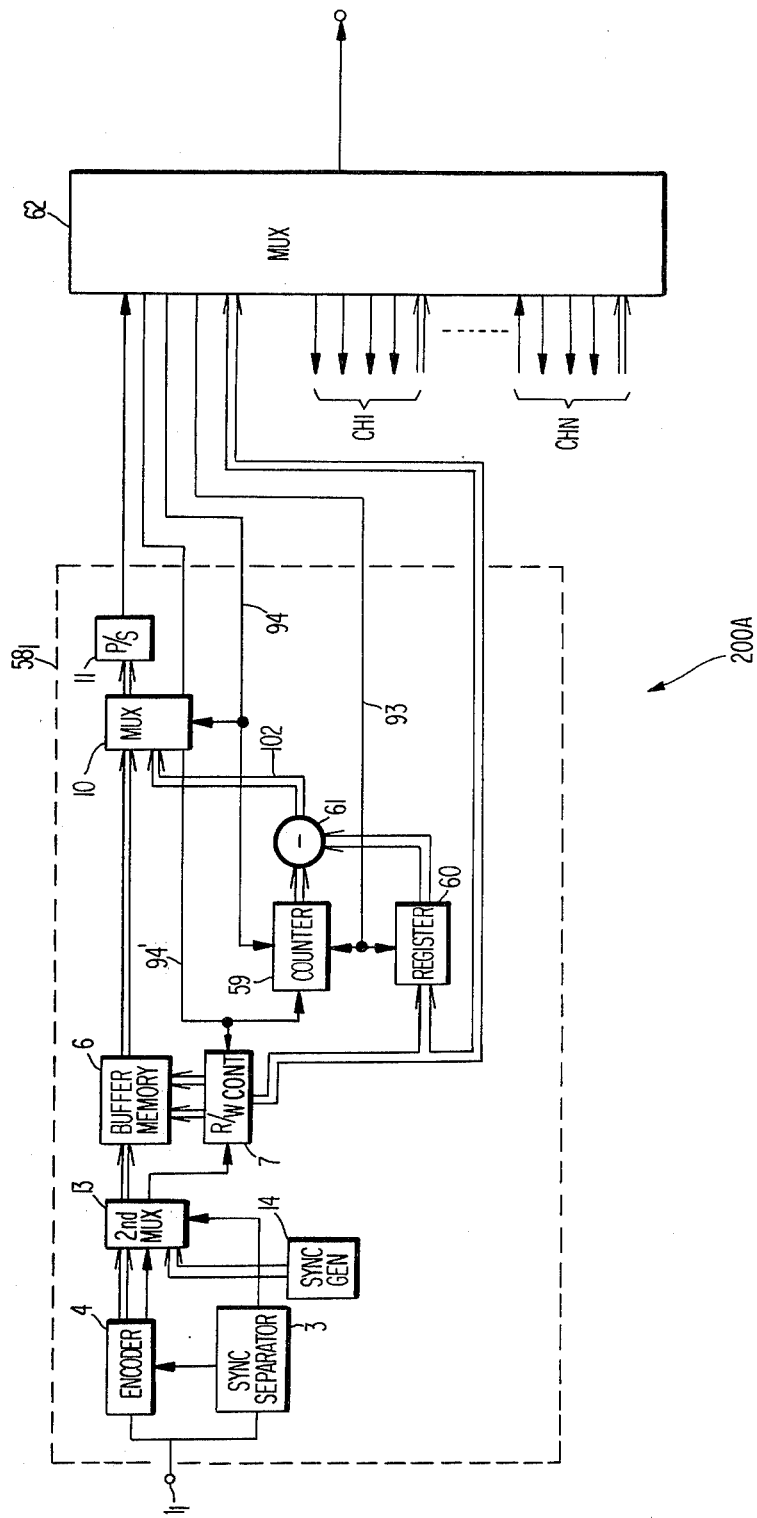
FIG. 12 is a block diagram of a transmitter of a second embodiment of this invention.
Figure 13:
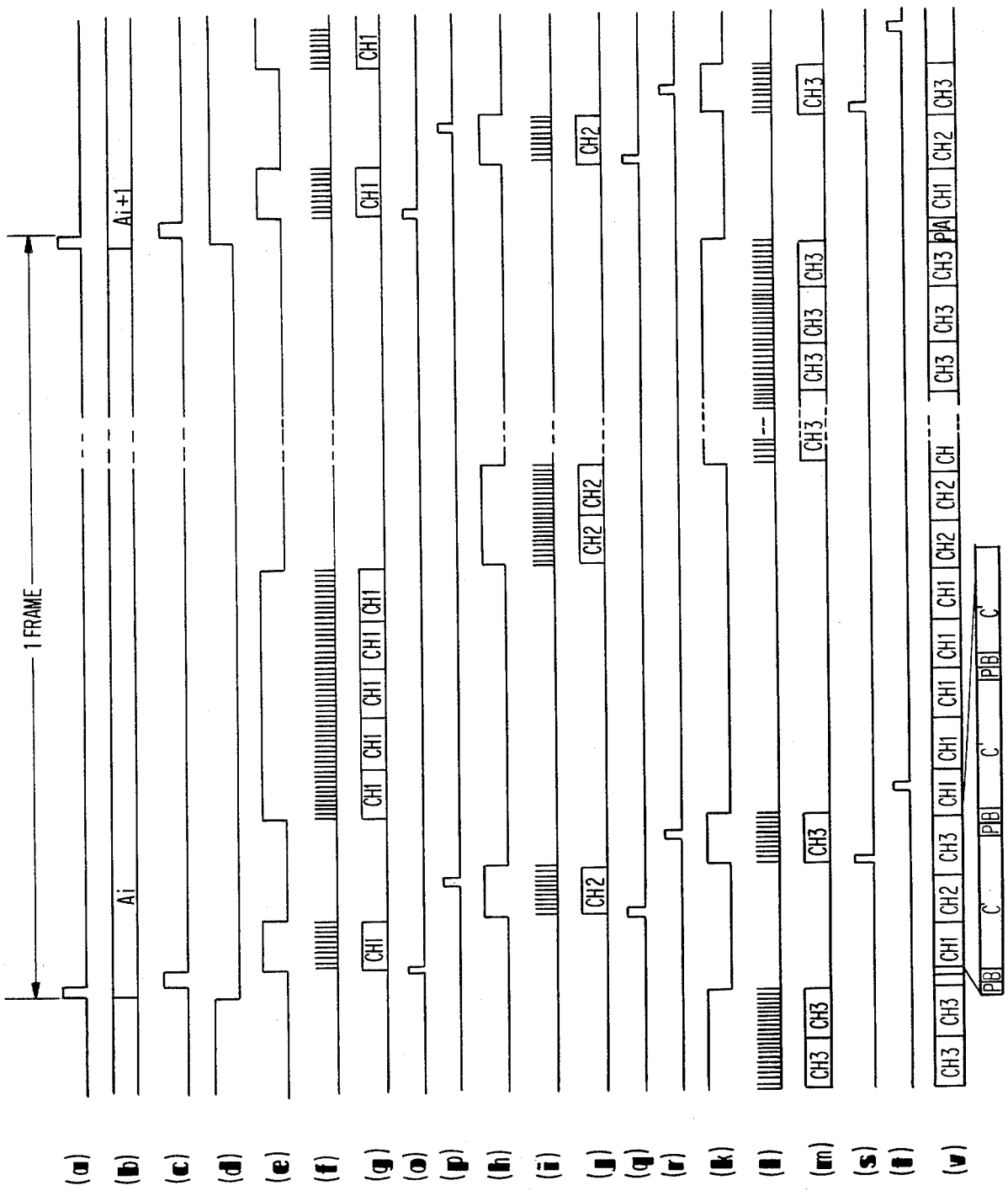
FIGS. 13a through 13v show waveforms for explaining the operation of the transmitter of FIG. 12.

Referring to FIGS. 12 and 13, a transmitter 200A used in a second embodiment of this invention comprises a plurality of encoding units (only one unit 53 is shown) and a multiplexer 62. An encoder 4 is supplied, at an input terminal $1_1$, with the video signal for encoding into a digitized video signal. The output of the encoder 4 is applied to a buffer memory 6 for temporary storage. A register 60, in response to a first control signal 93 (FIG. 13 (p)) supplied from the multiplexer 62, stores a buffer-occupancy code indicative of a buffer-occupancy state of the buffer memory 6. A counter 59, in response to the first control signal 93 as well as a second control signal 94 (FIG. 13 (o)), commences and terminates its counting of write-in pulses 94' supplied through another multiplexer 10 fed from the multiplexer 62, respectively. The output of the counter 59, therefore, indicates the amount of codes read out of the buffer memory 6 during the time interval defined by two applications of the first and the second control signals 93 and 94 to the counter 59. The output of the counter 59 and the register 60, which respectively correspond to $\int V_S(\tau)d$ and to $B_s(t)$ of the equation (8), are applied to a subtractor 61 for performing a subtraction thereon. The output 102 of the subtractor 61 is supplied to the multiplexer 10 responsive to the second control signal 94 for multiplexing the output code 102 and the codes read out of the buffer memory 6. The multiplexer 62 multiplexes the output of the plurality of encoding units as mentioned previously. First control signals of a second and a third encoding units (not shown) are depicted by FIGS. 13r and 13t, respectively, and on the other hand, second control signals of the second and the third encoding units by FIGS. 13q and 13s, respectively. The multiplexer 62 operates in the same manner as the multiplexer 12 of FIG. 1 expect for the generation of the first and the second control signals 93 and 94, and the other blocks such as a read/write controller 7 and a parallel/serial converter 11 are identical in their functions to their counterparts. The first and the second control signals can be obtained by adding a ROM to the block diagram of FIG. 5, which is controlled by the output signal (used as an address) of the half-frequency divider 19.

Figure 14:
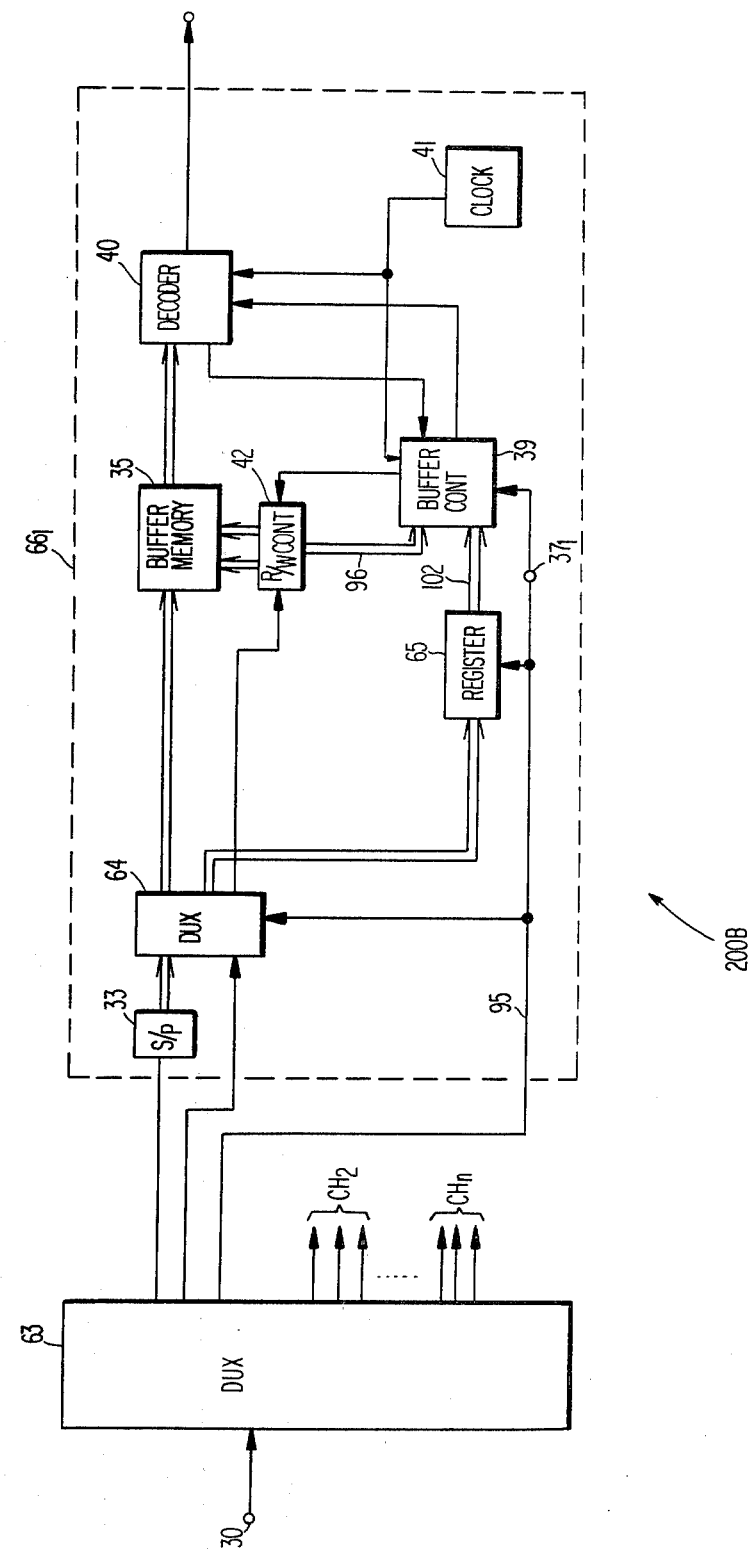
FIG. 14 is a block diagram of a receiver of the second embodiment of this invention.

Referring to FIG. 14, a receiver 200 B for the second embodiment comprises a demultiplexer 63 and a decoding unit $66_1$. The demultiplexer 63 is supplied, at an input terminal 30, with the multiplexed video signal transmitted from the transmitter 200A, so that the multiplexed video signal can be demultiplexed into plural digitized video signals, and the digitized video signal transmitted from the encoding unit $58_1$ of FIG. 12 can be applied to the decoder $66_1$. The demultiplexer 63 supplies a third control signal 95 to another demultiplexer 64, which signal 95 is indicative of the output 102 supplied from the subtractor 61. The demultiplexer 64 responsive to the third control signal 95 separates the code 102 from the multiplexed video signal supplied through a serial/parallel converter 33 from the demultiplexer 63. The separated code 102 is then stored in a register 65 in response to the third control signal 95. A buffer controller 39 is supplied with the output code 102 of the register 65 as well as the output 96 of a read/write controller 42 corresponding to the left side of the equation (8), and controls the buffer memory 35 so as to satisfy the equation (8). The function of the controller 39 is similar to that mentioned to in connection with FIG. 11. The demultiplexer 63 has the same functions as the demultiplexer 31 of FIG. 9 except for the production of the third control signal 95. The signal 95 can be readily generated by combination of a frequency divider and a ROM (not shown in FIG. 14).

Referring to FIG. 15, a transmitter 300A and a receiver 300B for use in a third embodiment based on the equation (9), are schematically illustrated in a block diagram. The transmitter 300A comprises a plurality of encoding units (only one unit $67_1$ is shown) and a first multiplexer 68. An encoder 4 receives, at an input terminal $1_1$, the television video signal and encodes it into a digitized video signal. The sync pulse separator 3 is also supplied with the video signal for separating the sync signals therein. A second multiplexer 13 is responsive to the sync pulses. The read/write controller 7, which is configured in the same manner as shown in FIG. 2, produces the buffer-occupancy codes 83 which are supplied to the third multiplexer 10. The multiplexer 10, in response to a fourth control signal 96 supplied from the first multiplexer 68, multiplexes the codes 83 and the codes read out from the first buffer memory 6. The multiplexer 68 receives the output of the third multiplexer 10 through the serial/parallel converter 11 in order to multiplex the digitized video signal fed from the other encoding units (not shown), and then transmits the multiplexed video signal to the receiver 300B.

The receiver 300B comprises a demultiplexer 69 and a plurality of decoding units only one of which is depicted by reference numeral $70_1$. The demultiplexer 69 is supplied, at the input terminal 30, with the multiplexed video signal transmitted from the transmitter 300A, so that the multiplexed video signal can be demultiplexed into plural digitized video signals corresponding to the output of said encoding units. The demultiplexer 64, in response to a fifth control signal 97 supplied from the demultiplexer 69, separates the buffer-occupancy code 83 from the digitized video signal fed from the encoding unit 67. A register 72 stores this signal 83 also in response to the signal 97. A counter 71 responsive to the control signal 97 starts to count the write-in clock pulses supplied to the buffer memory 35 and terminates the counting upon receipt of a sixth control signal 98 supplied from the demultiplexer 69 for counting the amount of write-in clock pulses supplied to the buffer memory 35 during the time interval. The output of the counter 71 and the register 72 are supplied to a subtractor 73 which performs a subtraction thereon to produce a signal indicative of the difference. The output of the subtractor 73 corresponds to the right side of the equation (9). The buffer memory controller 39 receives the output of the subtractor 73 and the output of the controller 42 corresponding to the left side of the equation (9) so as to control the buffer memory 35 based on the received signals in the same manner as mentioned in connection with FIG. 11.

Figure 16:
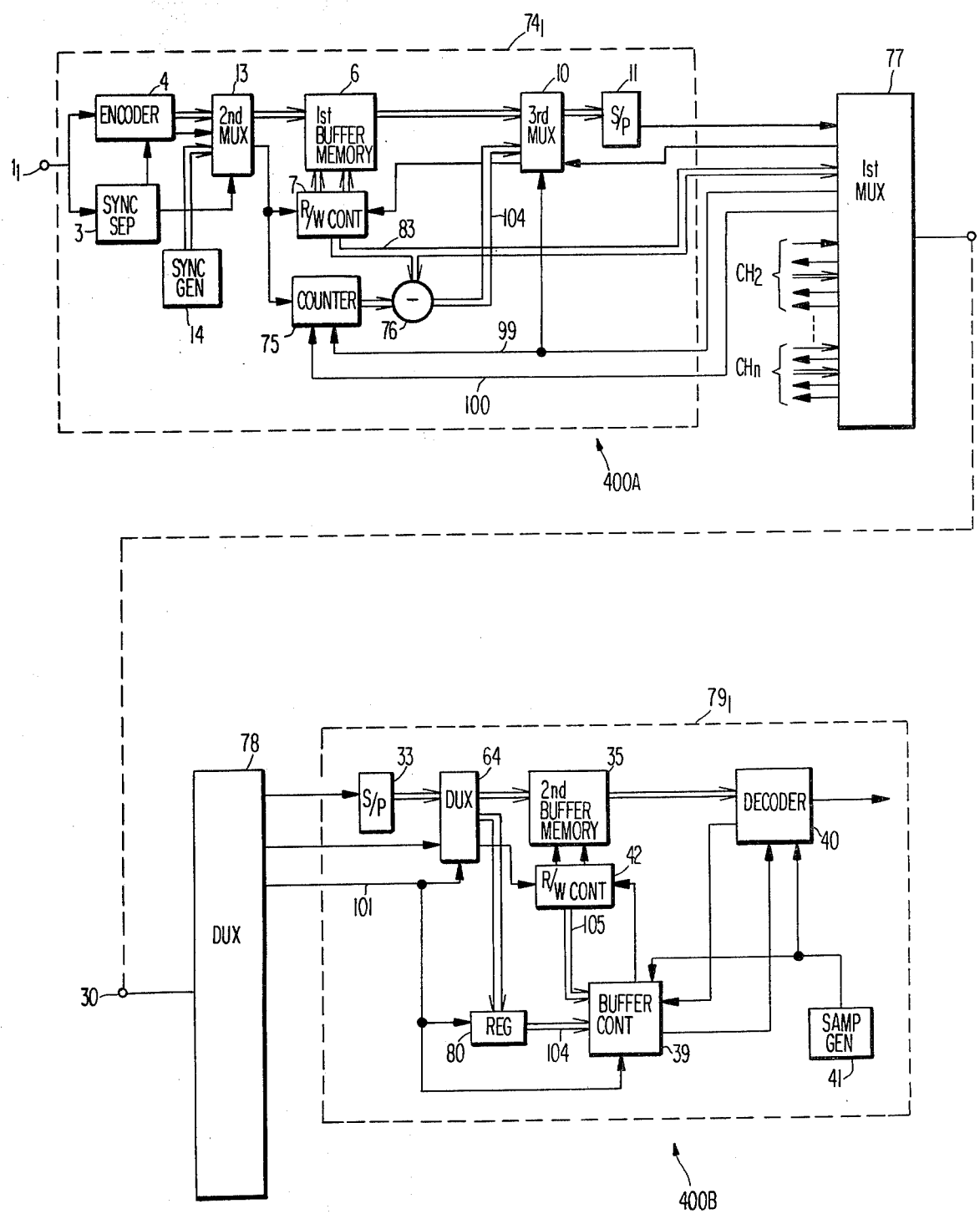
FIG. 16 is a block diagram of a fourth embodiment of this invention.

In FIG. 16, the fourth embodiment of this invention functions to satisfy the equation (10) and comprises a transmitter 400A and a receiver 400B. It is noted that the transmitter 400A differs from 300A (FIG. 15) in that a counter 75 and a subtractor 76 are added to the former. Whereas, the receiver 400B, unlike 300B (FIG. 15), is not provided with any counter or subtractor.

First, description on the transmitter 400A will be given in detail. The counter 75, in response to seventh and eighth control signals 99 and 100 supplied from a multiplexer 77, initiates and terminates its counting of the write-in pulses for use in writing the codes from the second multiplexer 13 into the first buffer memory 6. The read/write controller 7 produces the buffer-occupancy code 83. The buffer-occupancy code 83 and the output of the counter 75 are supplied to the subtractor 76 to perform a subtraction thereon. The output 104 of the subtractor 76 corresponds to the right side of the equation (10) and is multiplexed at the multiplexer 10 together with the codes read out from the buffer memory 6. The receiver 400B is supplied with the multiplexed video signal from the transmitter 400A. A ninth control signal 101 indicates or specifies a position of the output 104 of the subtractor 76. A register 80 responsive to the control signal 101 supplied from a demultiplexer 78 stores the output 104. The output of the register 80, that is, 104 (corresponding to the left side of the equation (10)) and an output 105 are fed to the buffer memory controller 39 which controls the operation of the second buffer memory 35 so as to satisfy the equation (10).

Since functions of the other blocks have been described in detail by reference to the preceding drawings, further description thereof will be omitted.

Although several embodiments of this invention are described and illustrated hereinbefore, various modifications can be made by those skilled in the art without departing from the subject matter of this invention.

What is claimed is:

1. In a digital transmission system for television video signals, which comprises a transmitter and a receiver, said transmitter comprising a plurality of input terminals for receiving respective television video signals to be transmitted, a plurality of encoding units for encoding said respective television video signals into digitized video signals, and a multiplexer for multiplexing said respective digitized video signals in a time division manner; and said receiver comprising a demultiplexer for receiving the multiplexed video signal transmitted from said multiplexer and for separating the same into said digitized video signals, and a plurality of decoding units for decoding said respective digitized video signals given from said demultiplexer into said respective television video signals, the improvement wherein:

each of said encoding units comprises a synchronization pulse separator for separating synchronization pulses in said television video signal, an encoder responsive to the separated synchronization pulses for encoding said television video signal into predetermined codes, a generator for generating video-frame-synchronization codes each indicative of the end of one picture frame of said television video signal, first means for multiplexing said video-frame-synchronization codes and the encoded codes of said encoder, a first buffer memory for temporarily storing the multiplexed codes given from said first means, a first read/write controller for supplying write-in and read-out address signals to said first buffer memory and for measuring a buffer-occupancy state of said first buffer memory to produce a buffer-occupancy code, second means for measuring a time interval from a time point when said video-frame-synchronization code is written into said first buffer memory to a time point when read out from the first buffer memory and for producing a first time-indicating code representative of said time interval, and third means for multiplexing the codes read out from said first buffer memory and said first time-indicating code and for supplying the output therefrom to said multiplexer; and each of said decoding units comprises a second buffer memory for temporarily storing said digitized video signal supplied from a corresponding encoding unit, a second read/write controller for producing write-in address signals for writing said multiplexed codes and said time-indicating code into said second buffer memory and for producing read-out address signals for reading out the codes stored in said second buffer memory, fourth means for detecting said first time-indicating code in said digitized video signal, fifth means for measuring a time interval from a time point when said video-frame-synchronization code is written into said second buffer memory to a time point when read out of the second buffer memory and for producing a second time-indicating code, and a buffer memory controller for comparing said first and said second time-indicating codes and for controlling said read-out address signals based on the comparison operation.

2. In a digital transmission system for television video signals, which comprises a transmitter and a receiver, said transmitter comprising a plurality of input terminals for receiving respective television video signals to be transmitted, a plurality of encoding units for encoding said respective television video signals into digitized video signals, and a multiplexer for multiplexing said respective digitized video signals in a time division manner, said receiver comprising demultiplexer for receiving said multiplexed video signal transmitted from said multiplexer and for separating the same into said digitized video signals, and a plurality of decoding units for decoding said respective digitized video signals given from said demultiplexer into said respective television video signals, the improvement wherein:

each of said encoding units comprises a synchronization pulse separator for separating synchronization pulses in said television video signal, an encoder responsive to the separated synchronization pulses for encoding said television video signal into predetermined codes, a generator for generating video-frame-synchronization codes each indicative of the end of one picture frame of said television video signal, first means for multiplexing said video-frame-synchronization codes and the encoded codes of said encoder, a first buffer memory for temporarily storing the multiplexed codes from said first means, a first read/write controller for supplying write-in and read-out address signals to said first buffer memory and for measuring a buffer-occupancy state of said first buffer memory to produce a first buffer-occupancy code, a register for storing said buffer-occupancy code at a first predetermined time point, second means for counting the amount of said multiplexed codes read out from said first buffer memory from said first predetermined time point to a second predetermined time point, a subtractor for subtracting the output of said register from the output of said second means, and third means for supplying both the output of said subtractor and said codes read out from said first buffer memory to said multiplexer; and each of said decoding units comprises a second buffer memory for temporarily storing said digitized video signal supplied from a corresponding encoding unit, second read/write controller for producing write-in address signals for writing said multiplexed codes into said second buffer memory and for producing read-out signals for reading out the codes stored in said second buffer memory and for measuring a buffer-occupancy state of said second buffer memory to produce a second buffer-occupancy code, fourth means for detecting and storing the output of said subtractor in said digitized video signal supplied from said corresponding encoding unit, and a buffer memory controller for comparing said second buffer-occupancy code with the output on said fourth means to control said read-out signals based on said comparison operation.

3. In a digital transmission system for television signals, which comprises a transmitter and a receiver, said transmitter comprising a plurality of input terminals for receiving respective television video signals to be transmitted, a plurality of encoding units for encoding said respective television video signals into digitized video signals and a multiplexer for multiplexing said respective digitized video signals in a time division manner; said receiver comprising a demultiplexer for receiving the multiplexed video signal transmitted from said multiplexer and for separating the same into said digitized video signals, and a plurality of decoding units for decoding said respective digitized video signals given from said demultiplexer into said respective television video signals, the improvement wherein:

each of said encoding units comprises a synchronization pulse separator for separating synchronization pulses in said television video signal, an encoder responsive to the separated synchronization pulses for encoding said television video into predetermined codes, a generator generating video-frame-synchronization codes each indicative of the end of one picture frame of said television video signal, first means for multiplexing said video-frame-synchronization codes and the encoded codes of said encoder, a first buffer memory for temporarily storing the multiplexed codes from said first means, a first read/write controller for supplying write-in and read-out address signals to said first buffer memory and for measuring a buffer-occupancy state of said first buffer memory to produce a first buffer-occupancy code, and second means for supplying said first buffer-occupancy code at a first predetermined time point and said multiplexed codes read out from said first buffer memory to said multiplexer; and each of said decoding units comprises a second buffer memory for temporarily storing said digitized video signal supplied from a corresponding encoding unit, second read/write controller for producing a write-in address signal for writing said multiplexed codes into said second buffer memory and for producing read-out address signal for reading out the codes stored in said second buffer memory and for measuring a buffer-occupancy state of said second buffer memory to producing a second buffer-occupancy code, third means for detecting and storing said first buffer-occupancy code in said digitized video signal supplied from said corresponding encoding unit, fourth means for counting the amount of write-in of said multiplexed codes from the detection of said first buffer-occupancy code to a second predetermined time point, a subtractor for subtracting the output of said third means from the output of said fourth means, and a buffer memory controller for comparing said second buffer-occupancy code with the output of said subtractor to control said read-out address signals of said second read/write controller.

4. In a digital transmission system for television video signals, which comprises a transmitter and a receiver, said transmitter comprising a plurality of input terminals for receiving respective television video signals to be transmitted, plural encoding units for encoding said respective television video signals into digitized video signals, and a multiplexer for multiplexing said digitized video signals in a time division manner, said receiver comprising a demultiplexer for receiving said multiplexed video signal transmitted from said multiplexer and for separating the same into said digitized video signals, and plural decoding units for decoding said respective digitized video signals into said respective television video signals, the improvement wherein:

each of said encoding units comprises a synchronization pulse generator for separating synchronization pulses in said television video signal, an encoder responsive to the separated synchronization pulses for encoding said television video signal into predetermined codes, a generator for generating video-frame-synchronization codes each indicative of the end of one picture frame of said television video signal, first means for multiplexing said video-frame-synchronization codes and the encoded codes of said encoder, a first buffer memory for temporarily storing the multiplexed codes from said first means, a first read/write controller for supplying write-in and read-out address signals to said first buffer memory and for measuring a buffer-occupancy state of said first buffer memory to produce a first buffer-occupancy code, second means for counting the amount of write-in of both said encoded codes of said encoder and said video-frame-synchronization codes into said first buffer memory, a subtractor for subtracting the first buffer-occupancy code output of said first read/write controller from the output of said second means, and third means for supplying the output of said subtractor and the multiplexed codes read out from said first buffer memory to said multiplexer; and each of said decoding units comprises a second buffer memory for temporarily storing said digitized video signal supplied from a corresponding encoding unit, a second read/write controller for producing write-in address signals for writing said multiplexed codes into said second buffer memory and for producing read-out address signals for reading out the codes stored in said second buffer memory and for measuring a buffer-occupancy state of said second buffer memory to produce a second buffer-occupancy code, fourth means for detecting and storing the output of said subtractor in said digitized video signal from said corresponding encoding unit, and a buffer memory controller for comparing said second buffer-occupancy code with the output of said fourth means to control the read-out address signals of said second read/write controller.

5. The improvement in a digital transmission system for television video signals as recited in claim 1, 2, 3 or 4, wherein said encoder generates writing pulses and said first multiplexer generates reading pulses, said first read/write controller comprising a first counter for counting said writing pulses, a second counter for counting said reading pulses, and a subtractor connected to said first and second counters for producing said buffer-occupancy code.

6. The improvement in a digital transmission system for television video system as recited in claim 1, 2, 3 or 4, wherein said multiplexer comprises a register which stores at least the most significant bits of said buffer-occupancy code from each of said plurality of encoding units, a channel-assignment-signal generator coupled to said register for producing a channel-assignment signal in response to an output of said register, means for generating clock pulses and a frame sync signal for transmission control, a counter for counting said clock pulses, said counter being reset by said frame sync signal, a read-out controller coupled to said channel-assignment-signal generator and said counter for producing gate pulses, first gating means controlled by said read-out controller for supplying said clock pulses to said read/write controller through said third means of each of said encoding units, and second gating means controlled by said read-out controller for transmitting the multiplexed codes from said third means of each of said encoding units, said channel-assignment signal and said frame sync signal.

7. The improvement in a digital transmission system for television video signals as recited in claim 6, wherein said demultiplexer comprises a frame-sync-signal detector for detecting said frame sync signal second means for generating clock pulses, a second counter coupled to said second means for generating clock pulses, said second counter being reset by the output of said frame-sync-signal detector, means coupled to said frame-sync-signal detector and said second means for generating clock pulses for producing a channel-assignment-signal-multiplexing pulse, a second register which stores the channel-assignment signal in the received multiplexed video signal in response to said channel-assignment-signal-multiplexing pulse, a write-in signal controller coupled to said second counter and said second register for producing gate pulses, and third gating means controlled by said write-in signal controller for passing clock pulses from said second means for generating clock pulses to said read/write controller of each of said decoding units.

8. In a digital transmission system for a television video signal, which comprises a transmitter and a receiver, said transmitter comprising an input terminal for receiving a television video signal to be transmitted, an encoding unit for encoding said television viedo signal into a digitized video signal; and said receiver comprising a decoding unit for decoding said digitized viedo signal into said television video signal, the improvement wherein:

said encoding unit comprises a synchronization pulse separator for separating synchronization pulses in said television video signal, an encoder responsive to the separated synchronization pulses for encoding said television video signal into predetermined codes, a generator for generating video-frame-synchronization codes each indicative of the end of one picture frame of said television video signal, first means for multiplexing said video-frame-synchronization codes and the encoded codes of said encoder, a first buffer memory for temporarily storing the multiplexed codes given from said first means, a first read/write controller for supplying write-in and read-out address signals to said first buffer memory and for measuring a buffer-occupancy state of said first buffer memory to produce a buffer-occupancy code, second means for measuring a time interval from a time point when said video-frame-synchronization code is written into said first buffer memory to a time point when read out from the first buffer memory and for producing a first time-indicating code representative of said time interval, and third means for multiplexing the codes read out from said first buffer memory and said first time-indicating code; and said decoding unit comprises a second buffer memory for temporarily storing said digitized video signal supplied from said encoding unit, a second read/write controller for producing write-in address signals for writing said multiplexed codes and said time-indicating code into said second buffer memory and for producing read-out address signals for reading out the codes stored in said second buffer memory, fourth means for detecting said first time-indicating code in said digitized video signal, fifth means for measuring a time interval from a time point when said video-frame-synchronization code is written into said second buffer memory to a time point when read out of the second buffer memory and for producing a second time-indicating code, and a buffer memory controller for comparing said first and second second time-indicating codes and for controlling said read-out address signals based on the comparison operation.

9. In a digital transmission system for a television video signal, which comprises a transmitter and a receiver, said transmitter comprising an input terminal for receiving a television video signal to be transmitted, an encoding unit for encoding said television video signal into a digitized video signal; and said receiver comprising a decoding unit for decoding said digitized video signal into said television video signal, the improvement wherein:

said encoding unit comprises a synchronization pulse separator for separating synchronization pulses in said television video signal, an encoder responsive to the separated synchronization pulses for encoding said television video signal into predetermined codes, a generator for generating video-frame-synchronization codes each indicative of the end of one picture frame of said television video signal, first means for multiplexing said video-frame-synchronization codes and the encoded codes of said encoder, a first buffer memory for temporarily storing the multiplexed codes from said first means, a first read/write controller for supplying write-in and read-out address signals to said first buffer memory and for measuring a buffer-occupancy state of said first buffer memory to produce a first buffer-occupancy code, a register for storing said buffer-occupancy code at a first predetermined time point, second means for counting the amount of said multiplexed codes read out from said first buffer memory from said first predetermined time point to a second predetermined time point, a subtractor for subtracting the output of said register from the output of said second means, and third means for multiplexing the output of said subtractor and said codes read out from said first buffer memory; and said decoding unit comprises a second buffer memory for temporarily storing said digitized video signal supplied from said encoding unit, second read/write controller for producing write-in address signals for writing said multiplexed codes into said second buffer memory and for producing read-out address signals for reading out the codes stored in said second buffer memory and for measuring a buffer-occupancy state of said second buffer memory to produce a second buffer-occupancy code, fourth means for detecting and storing the output of said subtractor in said digitized video signal supplied from said encoding unit, and a buffer memory controller for comparing said second buffer-occupancy code with the output on said fourth means to control said read-out address signals based on said comparison operation.

10. In a digital transmission system for a television signal, which comprises a transmitter and a receiver, said transmitter comprising an input terminal for receiving a television video signal to be transmitted, an encoding unit for encoding said television video signal into a digitized video signal; and said receiver comprising a decoding unit for decoding said digitized video signal into said television video signal, the improvement wherein:

said encoding unit comprises a synchronization pulse separator for separating synchronization pulses in said television video signal, an encoder responsive to the separated synchronization pulses for encoding said television video signal into predetermined codes, a generator for generating video-frame-synchronization codes each indicative of the end of one picture frame of said television video signal, first means for multiplexing said video-frame-synchronization codes and the encoded codes of said encoder, a first buffer memory for temporarily storing the multiplexed codes from said first means, a first read/write controller for supplying write-in and read-out address signals to said first buffer memory and for measuring a buffer-occupancy state of said first buffer memory to produce a first buffer-occupancy code, and second means for multiplexing said first buffer-occupancy code at a first predetermined time point and said multiplexed codes read out from said first buffer memory; and said decoding unit comprises a second buffer memory for temporarily storing said digitized video signal supplied from said encoding unit, second read/write controller for producing a write-in address signal for writing said multiplexed codes into said second buffer memory and for producing read-out address signal for reading out the codes stored in said second buffer memory and for measuring a buffer-occupancy state of said second buffer memory to produce a second buffer-occupancy code, third means for detecting and storing said first buffer-occupancy code in said digitized video signal supplied from said encoding unit, fourth means for counting the amount of write-in of said multiplexed codes from the detection of said first buffer-occupancy code to a second predetermined time point, a subtractor for subtracting the output of said third means from the output of said fourth means, and a buffer memory controller for comparing said second buffer-occupancy code with the output of said subtractor to control said read-out address signals of said second read/write controller.

11. In a digital transmission system for a television video signal, which comprises a transmitter and a receiver, said transmitter comprising an input terminal for receiving a television video signal to be transmitted, an encoding unit for encoding said television video signal into a digitized video signal; and said receiver comprising a decoding unit for decoding said digitized video signal into said television video signal, the improvement wherein:

said encoding unit comprises a sychronization pulse separator for separating synchronization pulses in said television video signal, an encoder responsive to the separated synchronization pulses for encoding said television video signal into predetermined codes, a generator for generating video-frame-synchronization codes each indicative of the end of one picture frame of said television video signal, first means for multiplexing said video-frame-synchronization codes and the encoded codes of said encoder, a first buffer memory for temporarily storing the multiplexed codes from said first means, a first read/write controller for supplying write-in and read-out address signals to said first buffer memory and for measuring a buffer-occupancy state of said first buffer memory to produce a first buffer-occupancy code, second means for counting the amount of write-in of both said encoded codes of said encoder and said video-frame-synchronization codes into said first buffer memory, a subtractor for subtracting the first buffer-occupancy code output of said first read/write controller from the output of said second means, and third means for multiplexing the output of said subtractor and the multiplexed codes read out from said first buffer memory; and said decoding unit comprises a second buffer memory for temporarily storing said digitized video signal supplied from said encoding unit, a second read/write controller for producing write-in address signals for writing said multiplexed codes into said second buffer memory and for producing read-out address signals for reading out the codes stored in said second buffer memory and for measuring a buffer-occupancy state of said second buffer memory to produce a second buffer-occupancy code, fourth means for detecting and storing the output of said subtractor in said digitized video signal from said encoding unit, and a buffer memory controller for comparing said second buffer-occupancy code with the output of said fourth means to control the read-out address signals of said second read/write controller.

* * * * *

UNITED STATES PATENT AND TRADEMARK OFFICE
CERTIFICATE OF CORRECTION

PATENT NO. : 4,215,369
DATED : July 29, 1980
INVENTOR(S) : Iijima

It is certified that error appears in the above—identified patent and that said Letters Patent is hereby corrected as shown below:

Column 1, line 55, after "Telecommunications" insert -- Conference Record --

Column 2, line 43, delete "indicting" and insert -- indicating --

Column 3, line 19, after "in" insert -- . --

Column 7, line 56, delete "$5_2$" and insert -- $55_2$ --

Column 15, line 4, delete "generator" and insert -- separator -- line 57, delete "system" and insert -- signals --

Column 17, line 11, delete "second" (first occurrence).

Column 9, line 3, insert "}" before τ instead of after τ.

Signed and Sealed this

Thirty-first Day of March 1981

[SEAL]

Attest:

RENE D. TEGTMEYER

Attesting Officer — Acting Commissioner of Patents and Trademarks